United States Patent Office 2,935,489
Patented May 3, 1960

2,935,489

PROCESS FOR POLYMERIZING ETHYLENICALLY UNSATURATED ORGANIC COMPOUNDS WITH THE AID OF HYDROXYL AMINE DERIVATIVES

Erich Bäder, Hanau, and Otto Schweitzer, Konigstein, Germany, assignors to Deutsche Gold- und Silber-Scheideanstalt vormals Roessler, Frankfurt am Main, Germany No Drawing. Application February 21, 1956
Serial No. 566,779

Claims priority, application Germany February 22, 1955

7 Claims. (Cl. 260—45.4)

The present invention relates to an improved process of preparing polymers by catalytic polymerization of polymerizable compounds containing terminal or centrally located double bonds between two carbon atoms, that is compounds containing a >C=C< group, and more particularly to an improved process of preparing such polymers with redox system catalysts.

The polymerization of compounds containing a >C=C< group, such as styrene, its derivatives, acrylic acid, methacrylic acid or their esters, vinyl compounds, acrylonitrile, butadiene, chlorobutadiene, dimethylbutadiene and the like, either alone or in combination, has already been carried out under many varying conditions. For example, the polymerization of such compounds can be carried out in solutions, in emulsions or in bulk. For many purposes, it is advantageous to employ a system in which a solution or a suspension of a high molecular weight polymer in a polymerizable monomer is polymerized. Such systems, for example, can be used with good success in dentistry.

It is furthermore known to employ compounds or combinations of compounds of redox systems as catalysts. In many instances, combinations have proved successful which contain oxygen, preferably in the form of a peroxide, and amines or their salts, preferably their hydrohalides, such as their hydrochlorides.

It has also been proposed to employ quaternary ammonium compounds and other onium compounds as polymerization accelerators in combination with peroxides and organic sulfur compounds, such as sulfinic acids or their salts, α-oxysulfones, sulfoxylates, α-aminosulfones, thioethers, which preferably are substituted by a hetero atom, such as nitrogen in α position, or mercaptans with the simultaneous presence of labile bound halogen or also small quantities of heavy metal compounds and/or mono or polyvalent aliphatic alcohols and/or small quantities of water.

According to the invention, it was unexpectedly found that the action of polymerization catalysts, especially redox system catalysts, is substantially improved by the addition of hydroxylamine derivatives which contain no labile hydrogen atom, that is, hydrogen atoms bound to oxygen, nitrogen or sulfur, of the following formula:

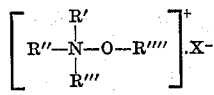

in which R', R", R''' and R'''' are aliphatic, aromatic, hydroaromatic or heterocyclic radicals which do not contain labile hydrogen atoms and X is an acid radical (anion), such as chlorine, sulfate, phosphate, sulfinic acid or sulfinic acid derivative radicals.

It was furthermore found that those hydroxylamine compounds which are soluble in the quantity to be employed in the monomer to be polymerized are especially active.

The action of the hydroxylamine compounds employed according to the invention can be still further improved by the addition of small amounts of heavy metal compounds, such as copper, manganese, cobalt and lead compounds, and/or mono or polyvalent aliphatic alcohols.

It furthermore has been found that in many instances the presence of a small quantity of water substantially accelerates the polymerization.

The process according to the invention can be used with particular advantage in bulk polymerization. The temperatures to be employed can be held relatively low and in most instances the polymerization can be carried out at room temperature and below. In some instances the polymerization can also be accelerated by heating.

In carrying out a bulk polymerization according to the invention, it is expedient to employ as a starting material a mixture or solution which contains at least one polymerizable liquid monomer and at least one polymeric compound.

In order to stabilize the monomeric component of the starting material, it has been found expedient to add small quantities of polyester resins, for example, reaction products of maleic acid or fumaric acid with diols, which are soluble in the monomeric component.

The catalyst combinations according to the invention have proved to be especially adapted for the production of prostheses, dental fillings, prostheses repairs, as well as for other technical uses, such as spachtelling masses, adhesives or reaction lacquers. They are well adapted for use in combination with monomeric methyl methacrylate and powdered polymerized methyl methacrylate, but their use is in no way limited thereto.

The polymerization systems according to the invention, especially for dental application, are marked by their especially rapid and complete polymerization, even in very thin layers, and excellent surface hardness of the resulting polymerized product. Furthermore, the polymerized products have high color stability and consequently in this respect fulfill the high requirements which are now met with. In addition to fillers, such as fiber material and glass filaments, the polymerizable systems according to the invention can also contain the usual pigments.

For dental applications, polymerizable systems containing solid components and liquid monomers, it is expedient to mix the redox system catalyst, such as the peroxide and a derivative of α-oxysulfone, with the powdered components and to dissolve the hydroxylamine derivative in the monomer. The monomeric methyl methacrylate can also contain the usual stabilizers.

The following examples will serve to illustrate several modifications according to the invention:

*Example 1*

0.6 cc. of monomeric methyl methacrylate containing 0.5% of a hydroxylamine derivative of the formula

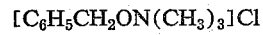

2% of 1,3-butylene glycol, and 15 γ copper per cc. (as naphthenate) was mixed with 1 gram of powdered polymeric methyl methacrylate admixed with 2% of an α-amino sulfone of the formula

and 1% of benzoyl peroxide.

The thin layer of the resulting mass which was confined in a vessel having a 25 mm. diameter hardened upon 12 minutes' standing. The ending of the polymerization was taken to be when the mass reached the temperature maximum.

*Example 2*

0.6 cc. of monomeric methyl methacrylate containing 0.5% of a hydroxylamine derivative of the formula [C₆H₅CH₂ON(C₂H₅)₃]Cl, 2% of ethanol, 1.5% of an unsaturated polyester resin produced from maleic acid and ethylene glycol, and 10 γ of copper per cc. (as naphthenate) was mixed with 1 gram of powdered polymeric methyl methacrylate admixed with 2% of an α-amino sulfone of the formula (CH₃C₆H₄SO₂CH₂)₂NC₂H₂C₆H₅ and 1% of dichlorobenzoyl peroxide.

The resulting mass hardened in a vessel having a 25 mm. diameter upon 13 minutes' standing.

*Example 3*

0.6 cc. of monomeric methyl methacrylate containing 0.5% of a hydroxylamine derivative of the formula

[C₆H₅CH₂ON(CH₃)₃]Cl

2% of 1,3-butylene glycol, and 15 γ copper per cc. (as naphthenate) was mixed with 1 gram of powdered polymeric methyl methacrylate admixed with 2% of p-tolyl sulfinic acid and 1% of benzoyl peroxide.

The resulting mass hardened in a vessel having a 25 mm. diameter upon 16 minutes' standing.

*Example 4*

Several grams of a polymerizable mixture containing 62% of an unsaturated polyester resin (produced from maleic acid anhydride and ethylene glycol), 33% of monostyrene and 5% of acrylic acid were admixed with 0.3% of a hydroxylamine derivative of the formula

[C₆H₅CH₂ON(CH₃)₃]Cl

10 γ copper per cc. (as naphthenate), 2% of an α-amino sulfone of the formula (CH₃C₆H₄SO₂CH₂)₂NC₂H₄C₆H₅ and 1% of benzoyl peroxide in a cylindrical vessel 15 mm. in diameter and the mixture permitted to polymerize. The mixture hardened in 2¼ minutes.

We claim:

1. In the preparation of a polymer by catalytic polymerization of a polymerizable mass comprising at least one polymerizable compound containing a >C=CH₂ group with a catalytic amount of a redox system catalyst containing at least one peroxide compound and at least one organic sulfur containing compound selected from the group consisting of sulfinic acid compounds, α-oxysulfones, sulfoxylates, α-amino sulfones, thioethers and mercaptans, the step which comprises conducting the polymerization of said mass in the presence of a catalytic amount of a hydroxylamine derivative of the formula $$\left[ \begin{array}{c} R' \\ | \\ R''-N-O-R'''' \\ | \\ R''' \end{array} \right]^+ \cdot X^-$$

in which R', R'', R''' and R'''' represent a radical selected from the group consisting of alkyl and aryl radicals and X is an inorganic acidic anion.

2. The process of claim 1 in which said polymerizable mass contains a small but catalytically effective quantity of copper naphthenate.

3. The process of claim 1 in which said polymerizable mass contains a small but catalytically effective quantity of a lower aliphatic alcohol.

4. The process of claim 1 in which said polymerizable mass contains a small but catalytically effective quantity of water.

5. The process of claim 1 in which said polymerization is carried out in bulk.

6. The process of claim 1 in which said polymerizable mass comprises an admixture of a liquid monomeric polymerizable compound containing a >C=CH₂ group and a polymeric compound obtained by the polymerization of at least one polymerizable organic compound containing at least one >C=CH₂ group.

7. The process of claim 1 in which said polymerizable mass contains an olefinically unsaturated polyester resin produced from a dihydric alcohol and a dibasic acid selected from the group consisting of maleic acid and fumaric acid.

References Cited in the file of this patent

UNITED STATES PATENTS

| | | |
|---|---|---|
| 2,480,928 | Hurdis | Sept. 6, 1949 |
| 2,488,149 | Vanderbilt et al. | Nov. 15, 1949 |
| 2,567,109 | Howard | Sept. 4, 1951 |
| 2,740,765 | Parker | Apr. 3, 1956 |

FOREIGN PATENTS

| | | |
|---|---|---|
| 477,863 | Canada | Oct. 16, 1951 |

OTHER REFERENCES

"Handbuch der Organischen Chemie," Beilstein, volume IV, 2nd supplement, chapter 10, page 953 (1942).